(12) United States Patent
Casco-Arias et al.

(10) Patent No.: US 8,121,889 B2
(45) Date of Patent: *Feb. 21, 2012

(54) INFORMATION TECHNOLOGY PORTFOLIO MANAGEMENT

(75) Inventors: Luis Casco-Arias, Austin, TX (US); William L. Bliss, Jr., Wellesley, MA (US); Stephen Biondi, Brookfield, CT (US); Thomas D. Christopherson, Rochester, MN (US); Charles S. Gauthier, Stewartwille, MN (US); Katherine A. Imming, Rochester, MN (US); Brian L. Peterson, Ridgefield, CT (US); Christopher H. Wicher, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2705 days.

This patent is subject to a terminal disclaimer.

(21) Appl. No.: 10/439,570

(22) Filed: May 16, 2003

(65) Prior Publication Data

US 2004/0230506 A1 Nov. 18, 2004

(51) Int. Cl.
*G06Q 90/00* (2006.01)
(52) U.S. Cl. ...................... 705/7.41; 705/7.29
(58) Field of Classification Search .................. 705/10, 705/7, 7.29, 7.41
See application file for complete search history.

(56) References Cited

U.S. PATENT DOCUMENTS

| | | | |
|---|---|---|---|
| 5,287,284 A | 2/1994 | Sugino et al. | |
| 5,710,578 A | 1/1998 | Beauregard et al. | |
| 5,844,817 A | 12/1998 | Lobley et al. | |
| 5,963,939 A | 10/1999 | McCann et al. | |
| 5,974,246 A | 10/1999 | Nakazawa | |
| 6,219,654 B1 | 4/2001 | Ruffin | |
| 6,243,859 B1 | 6/2001 | Chen-Kuang | |
| 6,301,516 B1 * | 10/2001 | Ostrowski et al. | 700/109 |
| 6,327,571 B1 | 12/2001 | Khayat et al. | |
| 6,556,974 B1 | 4/2003 | D'Alessandro | |
| 6,578,004 B1 * | 6/2003 | Cimral et al. | 705/7 |
| 7,103,561 B1 * | 9/2006 | Sarkisian et al. | 705/10 |
| 7,130,809 B1 * | 10/2006 | Fors | 705/10 |
| 7,184,934 B2 | 2/2007 | Russell et al. | |
| 7,206,760 B1 * | 4/2007 | Carey et al. | 705/35 |
| 7,219,068 B2 | 5/2007 | Zelek et al. | |
| 2002/0069102 A1 * | 6/2002 | Vellante et al. | 705/10 |
| 2002/0077882 A1 | 6/2002 | Nishikawa et al. | |
| 2002/0087388 A1 * | 7/2002 | Keil et al. | 705/10 |
| 2002/0184082 A1 * | 12/2002 | Nakano et al. | 705/10 |
| 2003/0126009 A1 | 7/2003 | Hayashi et al. | |
| 2003/0208429 A1 * | 11/2003 | Bennett | 705/36 |

(Continued)

OTHER PUBLICATIONS

Lawlis, Patricia, et al. "A Formal Process for Evaluating COTS Software Products." Computer: Innovative Technology for Computing Professionals. vol. 34, Iss. 5. (May 2001): pp. 58-63.*

(Continued)

*Primary Examiner* — Beth V Boswell
*Assistant Examiner* — Neil Kardos
(74) *Attorney, Agent, or Firm* — Marcia L. Doubet

(57) ABSTRACT

An information technology portfolio is managed using assessments that are based on a set of criteria. Each of the criteria may have one or more attributes, and may be different in priority from one another. The criteria are preferably directed toward evaluating, ensuring, and/or improving acceptance of the products in the portfolio by their target marketplace or market segment. Assessments are performed, using the criteria and attributes, and results of these assessments may be used when making various decisions regarding the products in the portfolio.

16 Claims, 16 Drawing Sheets

1200

| Product Portfolio Analysis | | 1210 Product 1 | 1220 Product 2 | 1230 Product 3 |
|---|---|---|---|---|
| 1240 — a. Criteria Assessed Score | | 62 | 64 | 59 |
| 1241 — b. Potential score with recommended improvements | | 80 | 72 | 76 |
| 1242 — c. Improvement to score with recommended actions | (b-a) | +18 | +8 | +17 |
| 1243 — d. Development cost to make recommended improvements | | $225K | $76K | $56K |
| 1244 — e. Cost to improve score 1 point | (d/c) | $12.5K | $9.5K | $3.3K |
| 1245 — f. Investment priority within Portfolio | (based on row e) | 3 | 2 | 1 |
| 1246 — g. Score priority within Portfolio | (based on row b) | 1 | 3 | 2 |
| 1247 — h. Invesment Attractiveness (f*g) | (lowest score is best) | 3 | 6 | 2 |
| 1248 — i. Investment priority | (based on row h) | 2 | 3 | 1 |

U.S. PATENT DOCUMENTS

| | | | | |
|---|---|---|---|---|
| 2003/0216955 | A1* | 11/2003 | Miller et al. | 705/10 |
| 2004/0068456 | A1* | 4/2004 | Korisch | 705/36 |
| 2004/0083151 | A1* | 4/2004 | Craig et al. | 705/36 |
| 2004/0177002 | A1 | 9/2004 | Abelow | |
| 2004/0199416 | A1 | 10/2004 | Heina et al. | |
| 2004/0199417 | A1* | 10/2004 | Baxter et al. | 705/10 |
| 2004/0225591 | A1 | 11/2004 | Chiappetta et al. | |
| 2004/0230464 | A1* | 11/2004 | Bliss et al. | 705/7 |
| 2004/0267502 | A1 | 12/2004 | Aliphas | |
| 2006/0161888 | A1 | 7/2006 | Lovisa et al. | |
| 2007/0083405 | A1* | 4/2007 | Britt et al. | 705/7 |
| 2007/0083419 | A1* | 4/2007 | Baxter et al. | 705/10 |
| 2007/0083420 | A1* | 4/2007 | Andresen et al. | 705/10 |
| 2007/0083504 | A1* | 4/2007 | Britt et al. | 707/5 |

OTHER PUBLICATIONS

Crow, Kenneth. "Customer-Focused Development with QFD." DRM Associates: Sep. 30, 2000. Accessed Apr. 14, 2008 via the Wayback Machine at www.archive.org.*

Cooper, Robert G., et al. "Portfolio Management for New Product Development: Results of an Industry Practices Study." R&D Management, vol. 31, No. 4: 2001.*

Cooper, Robert G., et al. "Portfolio Management for New Products: Picking the Winners." Product Development Institute: 2001.*

Olhager, Jan and B. Martin West. "The House of Flexibility: Using the QFD Approach to Deploy Manufacturing Flexibility." International Journal of Operations & Production Management, Bradford: 2002. vol. 22, Issue 1, p. 50.*

Lawlis, et al. A Formal Process for evaluating COTS Software Products, (C) 2001 IEEE, Computer, pp. 58-63.

Pommerenk, Stefan; Klevan, Lars, Oracle 8i Server: Oracle Applications R11.03 in Windows NT-Tuning and Best Practices, Technical White paper, Mar. 2000.

Regnell, et al. Visualization of Agreement and Satisfaction in Distributed Prioritization of Market Requirement, Feb. 2000, 6th International Workshop on Requirements Engineering for Software Quality, Jun. 5-6, Stockholm Sweden, pp. 1-12.

Jan Olhager, B Martin West, The House of Flexibility: Using the QFD Approach to Deploy Manufacturing Flexibility, International Journal of Operations & Production Management, Bradford: 2002. vol. 22, Issue 1 p. 50, 30 pgs.

Kent, Les, Goldberg, Cheryl., Tape Backup Solutions, InfoWorld, San Mateo: Mar 8, 1993. vol. 15, Iss. 10; p. 64, 9 pgs.

Carlton, Russ, Product Comparison: Electronic Mail Gets Its Wings, InfoWorld, San Mateo: Sep. 23, 1991. vol. 13, Iss. 38; p. 49, 9 pages.

Angus, Jeff, Diagnostic Utility Software, InfoWorld, San Mateo: May 3, 1993. vol. 15, Iss. 18: p. 64, 8 pages.

Mehta, Diane, McCracken, Harry, Seeing is Believing, InfoWorld, San Mateo: Aug. 29, 1994. vol. 16, iss. 35: p. 68, 9 pgs.

Brown, Aaron B., Seltzer, Margo., "Operating System Benchmarking in the Wake of Lmbench: A case study of the performance of NetBSD of the Intel x86 Architecture", 1997, ACM pp. 214-224.

Curnow, HJ., Wichmann, B.A., "A synthetic benchmark", 1976, Computer Journal, vol. 19, No. 1, pp. 43-49.

Kontio, Jyrki, "A Case Study in Applying a Systematic Method for COTS Selection", University of Maryland Department of Computer Science. Proceedings of ICSE-18, pp. 201-209. 1996.

Kontonya, Gerald and Ian Sommerville. "Requirements Engineering with Viewpoints". Software Engineering Journal. Jan. 1996. pp. 5-18.

Kontio, Jyrki. "OTSO: A Systematic Process for Reusable Software Component Selection". Institute for Advanced Computer Studies and Department of Computer Science, University of Maryland. Dec. 1995.

International Business Machines Corporation, "Autonomic Computing: IBM's Perspective on the State of Information Technology", IBM: Oct. 2002.

Stoll, Henry W. Product Design: Methods and Practices. Marcel Dekker: New York, 1999,. pp. 91-109 and 122-130.

Woodruff, Robert B. "Customer Value: The Next Source for Competitive Advantage." Journal of the Academy of Marketing Science. vol. 25, No. 2: 1997. pp. 139-153.

Mousavi, A, et al. "Customer optimization route and evaluation (CORE) for product design." International Journal of Computer Integrated Manufacturing. vol. 14, No. 2: 2001. pp. 236-243.

Jyrki Kontio et al., "Defining Factors, Goals and Criteria for Reusable Component Evaluation", CASCON '96 conference (1996).

Gianluigi Caldiera and Victor R. Basili, "Identifying and Qualifying Reusable Software Components", Computer (Feb. 1991).

Catherine Blake Jaktman and Eugene G. McGuire, "An Assessment Process for Reusable Software Assets", PICMET '97: International Conference on Management Technology, pp. 602-605 (1997).

Sen-Tang Lai and Chien-Chiao Yang, "A Software Metric Combination Model for Software Reuse", Software Engineering Conference 1998, pp. 70-77 (1998).

Ruben Prieto-Diaz and Peter Freeman, "Classifying Software for Reusability", IEEE Software, pp. 6-16 (1987).

Ruben Prieto-Diaz, "Domain Analysis: An Introduction", 15:2 Software Engineering Notes, pp. 47-54 (Apr. 1990).

Matzler, Kurt and Hans H. Hinterhuber, "How to make product development projects more successful by integrating Kano's model of customer satisfaction into quality function deployment". Technovation, 18:1 (1998). pp. 25-38.

Thomas D. Christopherson et al., U.S. Appl. No. 10/439,569, filed May 16, 2003, Office Action, Jun. 10, 2010, 14 pages.

Devanbu, Prem et al., "Analytical and Empirical Evaluation of Software Reuse Metrics", Proceedings of the 18th International Conference on Software Engineering, 1996. 19 pages.

Heeks, Richard. "eGovernment for Development: Design-Reality Gap Assessment: eGov Risk Assessment Technique 2". www.egov4dev.org/riskdrgap.htm Accessed Aug. 22, 2004. 12 pages.

Lowe, Antony et al., "QFD in new production technology evaluation", International Journal of Production Economics (2000). pp. 103-112.

Randy D. Baxter et al., U.S. Appl. No. 10/612,540, filed: Jul. 2, 2003, Office Action, Nov. 15, 2007, 21 pages.

Randy D. Baxter et al., U.S. Appl. No. 10/612,540, filed: Jul. 2, 2003, Office Action, Apr. 14, 2008, 21 pages.

Randy D. Baxter et al., U.S. Appl. No. 10/612,540, filed: Jul. 2, 2003, Office Action, Jul. 18, 2008, 13 pages.

Randy D. Baxter et al., U.S. Appl. No. 10/612,540, filed: Jul. 2, 2003, Office Action, Dec. 26, 2008, 16 pages.

Randy D. Baxter et al., U.S. Appl. No. 10/612,540, filed: Jul. 2, 2003, Office Action, Apr. 16, 2009, 14 pages.

Randy D. Baxter et al., U.S. Appl. No. 10/612,540, filed: Jul. 2, 2003, Office Action, Nov. 19, 2009, 14 pages.

Randy D. Baxter et al., U.S. Appl. No. 10/612,540, filed: Jul. 2, 2003, Notice of Abandonment, Jun. 8, 2010, 2 pages.

William L. Bliss, Jr. et al., U.S. Appl. No. 10/439,573, filed: May 16, 2003, Office Action, Nov. 5, 2007, 13 pages.

William L. Bliss, Jr. et al., U.S. Appl. No. 10/439,573, filed: May 16, 2003, Office Action, Apr. 24, 2008, 18 pages.

William L. Bliss, Jr. et al., U.S. Appl. No. 10/439,573, filed: May 16, 2003, Examiner Interview Summary, Jul. 3, 2008, 2 pages.

William L. Bliss, Jr. et al., U.S. Appl. No. 10/439,573, filed: May 16, 2003, Office Action, Aug. 5, 2008, 14 pages.

William L. Bliss, Jr. et al., U.S. Appl. No. 10/439,573, filed: May 16, 2003, Preliminary Appeal Brief Conference Decision, Nov. 26, 2008, 2 pages.

William L. Bliss, Jr. et al., U.S. Appl. No. 10/439,573, filed: May 16, 2003, Office Action, Dec. 26, 2008, 14 pages.

William L. Bliss, Jr. et al., U.S. Appl. No. 10/439,573, filed: May 16, 2003, Office Action, Jun. 25, 2009, 14 pages.

William L. Bliss, Jr. et al., U.S. Appl. No. 10/439,573, filed: May 16, 2003, Notice of Abandonment, Jan. 7, 2010, 2 pages.

Thomas D. Christopherson et al., U.S. Appl. No. 10/439,569, filed: May 16, 2003, Office Action, Oct. 26, 2007, 21 pages.

Thomas D. Christopherson et al., U.S. Appl. No. 10/439,569, filed: May 16, 2003, Office Action, Jun. 3, 2008, 26 pages.

Thomas D. Christopherson et al., U.S. Appl. No. 10/439,569, filed: May 16, 2003, Office Action, Dec. 10, 2008, 25 pages.

Thomas D. Christopherson et al., U.S. Appl. No. 10/439,569, filed: May 16, 2003, Office Action, Jul. 28, 2009, 27 pages.

Thomas D. Christopherson et al., U.S. Appl. No. 10/439,569, filed: May 16, 2003, Advisory Action, Sep. 17, 2009, 3 pages.

Thomas D. Christopherson et al., U.S. Appl. No. 10/439,569, filed: May 16, 2003, Office Action, Dec. 10, 2009, 25 pages.
Thomas D. Christopherson et al., U.S. Appl. No. 10/439,569, filed: May 16, 2003, Examiner Interview Summary, Feb. 26, 2010, 3 pages.
Thomas D. Christopherson et al., U.S. Appl. No. 10/439,569, filed: May 16, 2003, Office Action, Jun. 10, 2010, 14 pages.
Thomas D. Christopherson et al., U.S. Appl. No. 10/439,569, filed: May 16, 2003, Notice of Abandonment, Dec. 22, 2010, 3 pages.
Michael W. Britt et al., U.S. Appl. No. 11/244,644, filed: Oct. 6, 2005, Office Action, Dec. 12, 2007, 14 pages.
Michael W. Britt et al., U.S. Appl. No. 11/244,644, filed: Oct. 6, 2005, Office Action, Jun. 18, 2008, 15 pages.
Michael W. Britt et al., U.S. Appl. No. 11/244,644, filed: Oct. 6, 2005, Advisory Action, Aug. 26, 2008, 3 pages.
Michael W. Britt et al., U.S. Appl. No. 11/244,644, filed: Oct. 6, 2005, Office Action, Nov. 13, 2008, 12 pages.
Michael W. Britt et al., U.S. Appl. No. 11/244,644, filed: Oct. 6, 2005, Office Action, Apr. 17, 2008, 19 pages.
Michael W. Britt et al., U.S. Appl. No. 11/244,644, filed: Oct. 6, 2005, Notice of Abandonment, Dec. 10, 2009, 2 pages.
Randy D. Baxter et al., U.S. Appl. No. 11/244,510, filed: Oct. 6, 2005, Office Action, Nov. 23, 2007, 15 pages.
Randy D. Baxter et al., U.S. Appl. No. 11/244,510, filed: Oct. 6, 2005, Office Action, May 20, 2008, 16 pages.
Randy D. Baxter et al., U.S. Appl. No. 11/244,510, filed: Oct. 6, 2005, Examiner Interview Summary, Jul. 3, 2008, 2 pages.
Randy D. Baxter et al., U.S. Appl. No. 11/244,510, filed: Oct. 6, 2005, Office Action, Aug. 13, 2008, 15 pages.
Randy D. Baxter et al., U.S. Appl. No. 11/244,510, filed: Oct. 6, 2005, Office Action, Nov. 13, 2008, 19 pages.
Randy D. Baxter et al., U.S. Appl. No. 11/244,510, filed: Oct. 6, 2005, Advisory Action, Feb. 2, 2009, 3 pages.
Randy D. Baxter et al., U.S. Appl. No. 11/244,510, filed: Oct. 6, 2005, Office Action, Mar. 13, 2009, 22 pages.
Randy D. Baxter et al., U.S. Appl. No. 11/244,510, filed: Oct. 6, 2005, Office Action, Jul. 20, 2009, 14 pages.
Randy D. Baxter et al., U.S. Appl. No. 11/244,510, filed: Oct. 6, 2005, Notice of Abandonment, Feb. 2, 2010, 2 pages.
Catherine L. Andresen et al., U.S. Appl. No. 11/244,608, filed: Oct. 6, 2005, Office Action, Jul. 23, 2007, 10 pages.
Catherine L. Andresen et al., U.S. Appl. No. 11/244,608, filed: Oct. 6, 2005, Office Action, May 20, 2008, 10 pages.
Catherine L. Andresen et al., U.S. Appl. No. 11/244,608, filed: Oct. 6, 2005, Examiner Interview Summary, Jul. 3, 2008, 2 pages.
Catherine L. Andresen et al., U.S. Appl. No. 11/244,608, filed: Oct. 6, 2005, Office Action, Aug. 18, 2008, 13 pages.
Catherine L. Andresen et al., U.S. Appl. No. 11/244,608, filed: Oct. 6, 2005, Office Action, Nov. 12, 2008, 19 pages.
Catherine L. Andresen et al., U.S. Appl. No. 11/244,608, filed: Oct. 6, 2005, Advisory Action, Feb. 2, 2009, 3 pages.
Catherine L. Andresen et al., U.S. Appl. No. 11/244,608, filed: Oct. 6, 2005, Notice of Abandonment, Jun. 19, 2009, 2 pages.
Michael W. Britt et al., U.S. Appl. No. 11/244,789, filed: Oct. 6, 2005, Office Action, Dec. 17, 2007, 11 pages.
Michael W. Britt et al., U.S. Appl. No. 11/244,789, filed: Oct. 6, 2005, Office Action, Jun. 26, 2008, 21 pages.
Michael W. Britt et al., U.S. Appl. No. 11/244,789, filed: Oct. 6, 2005, Office Action, Feb. 24, 2009, 21 pages.
Michael W. Britt et al., U.S. Appl. No. 11/244,789, filed: Oct. 6, 2005, Office Action, Oct. 30, 2008, 17 pages.
Michael W. Britt et al., U.S. Appl. No. 11/244,789, filed: Oct. 6, 2005, Office Action, Jul. 27, 2009, 13 pages.
Michael W. Britt et al., U.S. Appl. No. 11/244,789, filed: Oct. 6, 2005, Notice of Abandonment, Feb. 18, 2010, 2 pages.

* cited by examiner

FIG. 1

Priced to Market
- priced to be competitive in this market
- price is linked or correlated to its usage
- total cost of the solution is competitive and attractive to the target market

Easy to Install
- installation can be performed using only a single server
- operation of the product requires only a single server
- installation is quick
- installation of the product is non-disruptive to the system and personnel
- the product is OEM-ready with a "silent" install/uninstall

Complete Software Solution
- all components, tools, and information are provided as a single package
- packaged solution is condensed
- all components of the packaged solution have consistent terms and conditions

Easy to Integrate
- the product coexists with, and works well with, other products sold for this market
- interoperates well with existing applications in its target environment
- exploits services of its target platform that have been proven to reduce total cost of ownership

Easy to Manage
- operational "out of the box"
- provides a default configuration that is appropriate for most installations
- set-up and configuration of the product can be performed with minimal administrative skill and interaction
- application templates and/or wizards are provided
- easy to fix
- easy to upgrade

Easy to Learn and Use
- user interface is simple and intuitive
- samples and tools are provided
- quality documentation, that is readily available, is provided

Right Function
- provides competitive features that are attractive to businesses in the target market segment
- features function in a consistent manner within the product, product family, and platform

Extensible and Flexible
- a clear upgrade path exists to more advanced features and functions
- customer's investment is protected when upgrading to advanced products

Reasonable Footprint
- usage of resources fits well on computing platform
- dependency chain is streamlined and does not impose a significant burden

Target Platform Support
- available on all "key" platforms of the target market

FIG. 2

| Criteria | Rank |
|---|---|
| Priced to market | 9 |
| Complete Solution - Available as a single product/package | 2(tie) |
| Easy to install | 8 |
| Easy to integrate | 7 |
| Right Function - Consistent usage | 5 |
| Right Function - Competitive features and functions | 4 |
| Easy to Manage | 6 |
| Easy to use and learn | 1 |
| Extensible & Flexible | 10 |
| Reasonable Footprint | 2(tie) |

FIG. 3

| | Definition | The product price should be competitive with comparable, leading products in the market segment and should provide an attractive entry price to this market segment. | | | | |
|---|---|---|---|---|---|---|
| 300 | | | | | | |
| | Information Required | | Name 320 | Vendor 330 | Version/ Release 340 | Price 350 | Pricing Model 360 |
| 310 | | Assessed Product | | | | | |
| 311 | | Competitive Product 1 | | | | | |
| 312 | | Competitive Product 2 | | | | | |
| 370 | Measurement Guidelines | Compare the product's price to the competitive products. Use the following rating scale: <br> 5 Price significantly beats competitive product <br> 4 Price beats competitive product <br> 3 Price meets competition <br> 2 Competitive product's price beats assessed product <br> 1 Competitive product's price significantly beats assessed product |
| 380 | Deviations/ Considerations | A reasonable price premium may be acceptable if product is unique or if product is clearly superior to competitive products in selected criteria measurements. |

FIG. 6
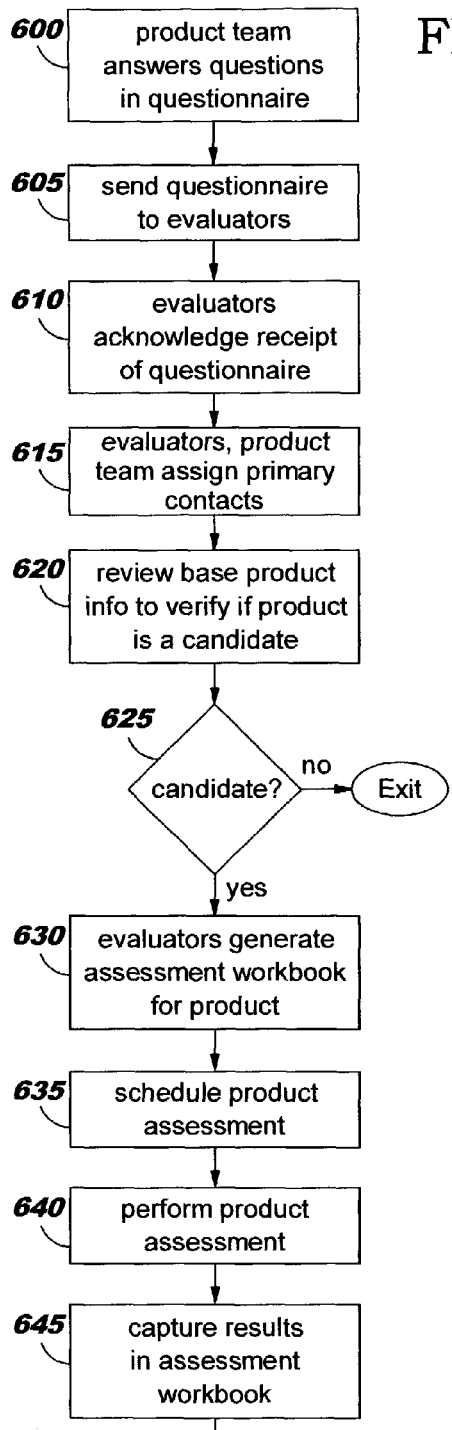
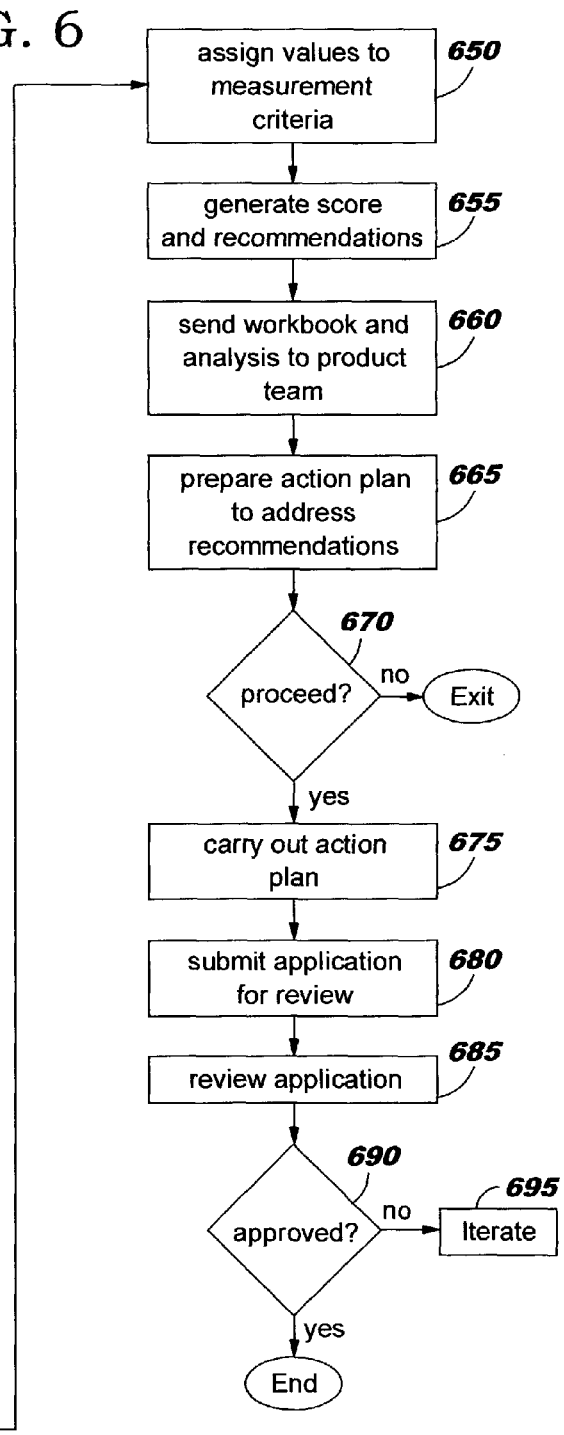

FIG. 7

Base Information

| Proposed Product Name | |
|---|---|
| Version to be assessed | |
| Platforms to be assessed | Win2000 |
| Download site for install image | |
| Target Availability (mm/dd/yyyy) | |
| Current Phase (Concept, Plan Avail) | |

1. What is the value proposition for this product?

2. Why is this a good mid-market candidate?

3. When making a purchase decision, what two products/vendors would a decision maker consider as the closest competitors to your product?

| Primary Competitor | |
|---|---|
| Secondary Competitor | |

Priced to Market

4. What usage metric is used for pricing?

| Usage Metric | Used(Yes/No) | Comments |
|---|---|---|
| per Name User | | |
| per Concurrent User | | |
| per Application User | | |
| per processor | | |
| per Server | | |
| per Managed resource (ie, TB of data) | | |
| other | | |

5. Why was this metric selected?

6. Provice pricing comparison to competition at various usage levels.
   Utilize the following conversions if needed:
   1 server = 2 processors
   1 concurrent user = 2.5 named users

| Usage Level | Candidate Product | Competitor |
|---|---|---|
| 1 usage unit | | |
| 10 usage units | | |
| 20 usage units | | |
| 100 usage units | | |
| 1 CPU | | |
| 4 CPU | | |

FIG. 7
(cont'd)

7. Are there any additional restrictions or limitations that your product places on usage?

8. At what usage level do you move off the assessed product to more advanced capability?

9. Can a customer add capacity as needed?

10. How does your product enforce usage?

11. Does your product require services to complete implementation or deployment?

12. Is total cost of your solution with services < $100,000?

13. Can your product be effectively administered with minimal admin training (e.g., less than 8 hours)?

14. Are adequate education materials provided (in package or online) so that admin skills can be self taught?

Complete Software Solution

15. What external dependencies does your product have (i.e., other products or services)?

16. How many CDs are delivered to customer when they order your product?

17. How many CDs are required to actually install the product?

18. Does your install package contain any optional software (like "try-and-buys")?

19. What are the terms and conditions for you product?

20. Are they similar to (i.e., consistent with) other mid-market products?

21. How do they differ from Enterprise versions of product?

Easy to Install

22. Does your product require more than one server for effective operation?

23. Does it require exclusive use of the server with reasonable work load for the product?

24. Does your product offer silent install/uninstall capabilities?

FIG. 7
(cont'd)

25. Can it easily be wrapped by third party solution install technology?

26. What install technology is used?

Easy to Integrate

27. How does your product relate to other mid-market products?

| Assessed Product | Mid-Market Product 1 | Mid-Market Product 2 | Mid-Market Product 3 | Mid-Market Product 4 |
|---|---|---|---|---|
| Provides services to | | | | |
| Is dependent on | | | | |
| Unaware of but can coexist with | | | | |
| Aware of and makes use of | | | | |
| Aware of and extends | | | | |
| Makes use of Enterprise version of | | | | |

28. How does your product relate to and support other popular applications and formats?

29. Does your product obtain any 3rd party vendor certifications (Windows 2000, IBM, Clustering, Novell...)?

Easy to Learn and Use

30. What are the primary user-roles supported by your product?
    (yes/no)
    - Admin
    - Developer
    - Application user
    - Other (list)

31. Does your product provide default and advanced configuration templates?

32. How many hours of training are required to effectively administer your product?

33. What is the fix/update strategy for your product?

34. Are fix packs cumulative?

35. Are hot fixes (delta updates) available?

36. How often are fixes generated?

FIG. 7
(cont'd)

37. Is an online download site available for product updates?

38. Is it publicly available or does it require a service contract?

39. How easy is it for customers to determine what fix is needed (e.g. how many minutes)?

Right Function
40. What are the primary features provided by your product?

41. How does this compare to your competitors?

42. Do you have any third party assessments that compare your product's features with your competitors?

43. What third party recognition or endorsements has your product received?

44. Are product capabilities and features consistent across platforms?

45. Does your product belong to a "family of products"?

46. If so, is it clearly positioned with other products in the family?

47. What differentiates this product from the Enterprise version of the product?

Extensible and flexible
48. How does assessed product differ from Enterprise version?

| Difference : | Y/N | comment |
|---|---|---|
| Adjustment in feature set provided | | |
| Lower price per usage metric | | |
| Different terms and conditions | | |
| Reduced packaging | | |
| Improved ease-of-use / tooling | | |
| Reduced platform support | | |
| Reduced Admin needs and complexity | | |
| Different support level/pricing | | |

FIG. 7
(cont'd)

49. Does your product provide a clear upgrade path to more advanced function?

50. When moving to advanced function, what percentage of the customer's invenstment in services and customer development get retained?

51. Are migration services/tools provided?

52. From competitors products?

Mid-market Platform Support

53. What platforms does your product support?

54. Which ones will it support in near future?
Y=Yes, P=Planned, N=not supported, NA=not applicable

| Platform | Server | Clients | Admin | Agents | Development |
|---|---|---|---|---|---|
| Win2000/XP | | | | | |
| iSeries | | | | | |
| Linux | | | | | |
| Solaris | | | | | |
| HP/UX | | | | | |
| IBM AIX | | | | | |
| Web Based | | | | | |
| Other | | | | | |

End of Questionnaire

FIG. 8

| Star 800 | • Product Assessment score > 80%<br>• All attributes scored 3 or higher |
|---|---|
| Ready 810 | • Product Assessment score >70%<br>• Committed plan to address all attributes scoring less than 3<br>• Committed plan to satisfy all critical attributes before product availability |

820 Critical Attributes

830
- Priced to Market: Competitive pricing
- Priced to Market: Price linked to usage
- Complete Software Solution: Single Package
- Complete Software Solution: Consistent terms and conditions
- Easy to Install: Single Server Operation
- Easy to Install: Non-disruptive to system and personnel
- Easy to Install: Silent Install (OEM ready)
- Easy to Integrate: Coexists and works well with other mid-market products
- Easy to Manage: Operational out of the Box - default config
- Easy to Manage: Minimal administrative interaction required
- Easy to Learn and use: Samples and tools for quick start
- Easy to Learn and use: Successful first-use experience
- Extensible & Flexible: Clear upgrade path to advanced function
- Extensible & Flexible: Investment is protected
- Right Function: Consistent Feature usage
- Reasonable Footprint: Competitive Footprint

Results of Product Assessment for Product XYZ

910

| Product Assessment Score |
|---|
| Product XYZ :            87.65% |
| Product ABC :            67.89% |
| Acme Computing Product : 71.23% |

920 — Attributes not meeting requirements:

Complete Software Solution: single package    score: 2
921        Impact to score if brought to minimum: .67%
        Comments: requires product DEF, not included in install package
    Easy to Learn and Use:
922        Samples and tools are provided    score: 2
        Impact to score if brought to minimum: .34%
        Comments: sample would be useful for function PQR

930 — Recommended Actions:
    1) Include product DEF in install package
    2) Provide sample for how to use function PQR

FIG. 10

Autonomic Computing

Self-configuring

With the ability to dynamically configure itself on the fly, an IT environment can adapt immediately - and with minimal human intervention - to the deployment of new components or changes in the IT environment.

Self-healing

Self-healing IT environments can detect improper operations (either proactively through predictions or otherwise) and then initiate corrective action without disrupting system applications. Corrective action could mean that a product alters its own state or influences changes in other elements of the environment.

Self-optimizing

Self-optimizing refers to the ability of the IT environment to efficiently maximize resource allocation and utilization to meet end users' needs with minimal human intervention.

Self-protecting

The goal of self-protecting environments is to provide the right information to the right users at the right time through actions that grant access based on the users' role and pre-established policies. A self-protecting IT environment can detect hostile or intrusive behavior as it occurs and take autonomous actions to make itself less vulnerable to unauthorized access and uses, viruses, denial-of-service attacks, and general failures.

| | Self-configuring | Self-healing | Self-optimizing | Self-protecting |
|---|---|---|---|---|
| 1110 Easy to Install | Able to get application installed and running with minimal skill and interaction | | | |
| 1120 Easy to Manage | Upgrades are performed with minimal skill and interaction | Problems are fixed with minimal skill and interaction | Application performance is improved with minimal skill and interaction | Security threats are neutralized with minimal skill and interaction |
| 1130 Easy to Integrate | Able to detect and integrate with other products | | | |
| 1140 Easy to Learn and Use | | | Less worry having to do everything "right" from the start | Less worry about accidental exposure of sensitive information |
| 1150 Extensible and Flexible | Extensions can be made with minimal skill and interaction | | | |

FIG. 12

| Product Portfolio Analysis | Product 1 | Product 2 | Product 3 |
|---|---|---|---|
| a. Criteria Assessed Score | 62 | 64 | 59 |
| b. Potential score with recommended improvements | 80 | 72 | 76 |
| c. Improvement to score with recommended actions (b-a) | +18 | +8 | +17 |
| d. Development cost to make recommended improvements | $225K | $76K | $56K |
| e. Cost to improve score 1 point (d/c) | $12.5K | $9.5K | $3.3K |
| f. Investment priority within Portfolio (based on row e) | 3 | 2 | 1 |
| g. Score priority within Portfolio (based on row b) | 1 | 3 | 2 |
| h. Investment Attractiveness (f*g) (lowest score is best) | 3 | 6 | 2 |
| i. Investment priority (based on row h) | 2 | 3 | 1 |

INFORMATION TECHNOLOGY PORTFOLIO MANAGEMENT

RELATED INVENTIONS

The present invention is related to commonly-assigned U.S. patent application Ser. No. 10/612,540, entitled "Assessing Information Technology Products" (referred to hereinafter as "the related invention"), which was filed on Jul. 2, 2003 (claiming priority from Provisional Application Ser. No. 60/459,770 and having priority date Apr. 2, 2003); U.S. patent application Ser. No. 10/439,573, entitled "Designing Information Technology Products", which was filed concurrently herewith on May 16, 2003; and U.S. patent application Ser. No. 10/439,570, entitled "Information Technology Portfolio Management", which was filed concurrently herewith on May 16, 2003.

BACKGROUND OF THE INVENTION

1. Field of the Invention

The present invention relates to information technology portfolio management, and deals more particularly with techniques for managing an information technology portfolio using product assessments that are performed using a set of criteria. The criteria are preferably directed toward evaluating, ensuring, and/or improving acceptance of the products in the portfolio by their target marketplace.

2. Description of the Related Art

Developing an information technology ("IT") product may require a tremendous allocation of resources. For a complex IT product, for example, thousands of person hours and a huge financial outlay may be expended during the development effort. If the product is successful in its target marketplace (or, equivalently, with its target audience), then this resource allocation is typically justified. However, in some cases, a product is not well-received. In these cases, it may happen that a financial return is not realized on the development effort and resource investment.

The market for IT products is highly competitive, and this competition is only increasing over time. If companies in the business of developing IT products are to prosper economically, it behooves them to take all reasonable steps to ensure that the products they develop will be desirable to their target marketplace.

A number of factors may influence whether an IT product is successful with its target marketplace, and these factors may vary among different segments of the marketplace. In the industry, segments of the IT marketplace have sometimes been defined in terms of large business enterprises, medium-sized business enterprises, and small business enterprises. By convention, an enterprise employing over 1,000 people worldwide is considered a large business; those employing less than 100 people worldwide are considered small businesses; and those in between are considered to be medium-sized businesses.

As an example of how differences among marketplace segments influence a product's acceptance, a large business enterprise may employ a staff of well-trained and highly-skilled IT professionals; on the other hand, a medium-sized or small business may have few (or perhaps no) on-site IT personnel. Thus, an IT product that involves complex installation or usage procedures may be acceptable for the large business, but these same characteristics may not be acceptable in the medium-sized or small business environment.

Accordingly, what is needed are improved techniques for managing an IT portfolio, particularly with regard to a product's target marketplace or market segment.

SUMMARY OF THE INVENTION

An object of the present invention is to provide techniques for managing an IT portfolio.

Another object of the present invention is to provide techniques for managing an IT portfolio using product assessments that are performed using a set of criteria.

A further object of the present invention is to provide techniques for managing an IT portfolio with a view toward evaluating, ensuring, and/or improving acceptance of the products in the portfolio by their target marketplace or market segment.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention defines techniques for managing an IT portfolio. In one aspect of preferred embodiments, this comprises: determining a plurality of criteria that are important to a target market for products in an IT portfolio, and at least one attribute that may be used for measuring each of the criteria; specifying objective measurements for each of the attributes; conducting an evaluation of a plurality of the IT products in the portfolio; and using a computed assessment score and a computed potential assessment score for each of the evaluated IT products to select a subset of the IT products in the IT portfolio, wherein the subset may comprise one or more of the evaluated IT products having the highest potential assessment scores. The evaluation of each of the IT products preferably further comprises: inspecting a representation of the IT product, with reference to selected ones of the attributes; assigning attribute values to the selected attributes, according to how the IT product compares to the specified objective measurements; and computing the assessment score, for the IT product, from the assigned attribute values.

Conducting the evaluation may further comprise generating a list of recommended actions, the list having an entry for each of the selected attributes for which the assigned attribute value falls below a threshold value. The subset may comprise those evaluated IT products having the highest ones of the potential compared assessment scores or those for which the lowest investments of resources are needed to improve the assessment scores of those products.

The comparison may further comprise comparing the assigned attribute values, such that the subset comprises those evaluated IT products having highest ones of the compared assessment scores and highest ones of the assigned attribute values for selected ones of the attributes.

The assessment score may be programmatically computed. Using the assessment scores and the potential assessment score scores is preferably performed using an electronic version of one or more product assessment workbooks, each workbook recording the assigned attribute values from the evaluation of one or more of the IT products.

The subset may be used to determine which of the IT products in the portfolio will be revised, which of the IT products in the portfolio will be deployed to one or more new target markets, which of the IT products cannot be revised in a cost-effective manner, which of the IT products are financially desirable (e.g., to investors), and so forth.

In an alternative aspect, the computed assessment scores may be compared to assessment scores computed for one or more competitive products, for example to identify a subset of the evaluated IT products whose computed assessment scores compare to the assessment scores of the competitive products according to a particular comparison criterion (e.g., better than the competition, worse than the competition, etc.).

Or, the comparison may compare the assigned attribute values for selected ones of the evaluated IT products to determine how those selected ones compare to market expectations of the target market. In this case, the best products may be selected from the IT portfolio, where those best products comprise the selected ones that compare most favorably to the market expectations.

In another aspect, preferred embodiments of the IT portfolio management technique comprise: determining a plurality of criteria for measuring products in an IT portfolio, and at least one attribute that may be used for measuring each of the criteria; specifying objective measurements for each of the attributes; conducting an evaluation of one or more of the IT products in the portfolio; and using the recorded attribute values for the evaluated IT products to make decisions regarding the IT products in the IT portfolio. The recorded attribute values may be used along with development sizings to incorporate recommended actions for improvement of the portfolio and/or its products.

In this aspect, the evaluation of each of the one or more IT products preferably further comprises: inspecting a representation of a selected one of the one or more IT products, with reference to selected ones of the attributes; assigning attribute values to the selected attributes, according to how the selected IT product compares to the specified objective measurements; and recording, for the selected IT product, the assigned attribute values.

The present invention may also be used advantageously in methods of doing business. For example, techniques disclosed herein may be used by companies developing or revising an IT portfolio, in order to improve that portfolio. Preferably, the improvements relate to acceptance of products in the portfolio in their target marketplace or market segment. Techniques disclosed herein may also be offered as methods of doing business whereby IT portfolio reviews are performed for third parties, for example to assist a third party in improving the characteristics of the products in the portfolio and their desirability to the target marketplace or market segment. When provided for a fee, this service may be provided under various revenue models, such as pay-per-use billing, a subscription service, monthly or other periodic billing, and so forth.

The present and related inventions will now be described with reference to the following drawings, in which like reference numbers denote the same element throughout.

BRIEF DESCRIPTION OF THE DRAWINGS

FIG. 1 illustrates example criteria and attributes used for a product assessment, according to the related invention;

FIG. 2 depicts example rankings showing the relative importance of assessment criteria for IT purchasers in a sample target market segment, according to the related invention;

FIG. 3 shows an example of textual descriptions that may be defined to assist product assessors in assigning values to attributes in a consistent, objective manner, according to the related invention;

FIG. 6 provides a flowchart that depicts details of how a product assessment may be carried out, according to the related invention;

FIG. 7 contains a sample questionnaire, of the type that may be used to solicit information from a product team whose IT product will be assessed, according to the related invention;

FIG. 8 depicts an example of how two different product assessment scores may be used for assigning special designations to assessed products, according to the related invention;

FIG. 9 illustrates a sample product assessment report, according to the related invention;

FIG. 10 provides definitions of autonomic computing characteristics;

FIG. 11 illustrates how attributes from several assessment criteria may be mapped to the autonomic computing characteristics of FIG. 10, according to the related invention; and FIG. 12 illustrates how products can be selected for investment within a portfolio of IT products, using an assessment score and development sizings for a set of products that have been assessed using techniques disclosed herein.

DESCRIPTION OF PREFERRED EMBODIMENTS

Figure 4:
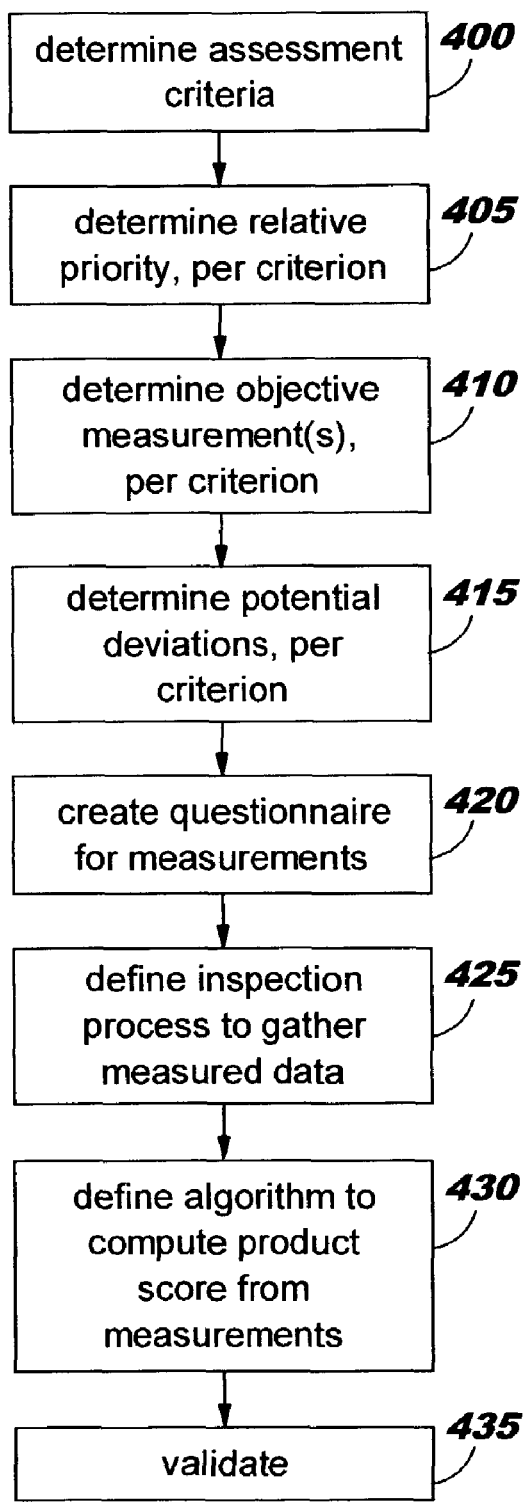
FIG. 4 provides a flowchart that illustrates, at a high level, actions that are preferably carried out when establishing an assessment process according to the related invention.

The related invention disclosed techniques for assessing products. Techniques from the related invention are leveraged, according to the present invention, for IT portfolio management. The product assessment techniques of the related invention will now be described, followed by a description of how those techniques are leveraged by the present invention.

The related invention provides techniques for assessing IT products, by comparing a product (including a product still under development) to a set of criteria. Each of these criteria has one or more attributes, and may be different in priority from one another. In preferred embodiments, a product assessment score is created as a result of the comparison. When necessary, a set of recommendations for product change is also created.

A goal of the assessment process disclosed in the related invention is to improve the IT product being assessed, and in preferred embodiments, the improvements are directed toward securing the product's acceptance by its target marketplace or market segment. As discussed earlier, the IT marketplace is sometimes divided into three general market segments, based on the size of business enterprise (typically measured by number of employees) that will use the IT product. An alternative market segmentation can also be used. For example, the market segment may be based on industry focus. Preferably, the measurement criteria and attributes used in the assessment process are developed for a particular market segment. In this manner, the assessment process is capable of providing more precise indicators of product acceptance and, when necessary, more effective recommendations for product improvements. (References hereinafter to the marketplace and market segment are intended to be synonymous. These references are also intended to include a target audience that receives an IT product without paying a fee, and that is therefore outside the traditional definition of "market".)

By defining attributes for the assessment criteria with reference to the IT product's target market segment, the "wants and needs" of the target market segment are directly reflected by the assessment process. Therefore, the product assessment score resulting from the assessment is an indicator of how well the assessed product will be received in its target market segment. The product assessment score is preferably expressed as a numeric value, based on computations performed with values of the measurement criteria and attributes, and may be used in a "go or no-go" decision for moving forward with product development and/or release to market.

Techniques of the related invention will be described herein with reference to a particular set of criteria and attributes developed to assess software products for delivery to both the small and medium-sized business ("SMB") markets (sometimes referred to as the "mid-market"), as well as algorithmic techniques for computing a product assessment score expressed as a percentage value. However, it should be noted that these descriptions are by way of illustrating use of the novel techniques of the related invention, and should not be construed as limiting the related invention to these examples. In particular, alternative target markets, alternative criteria, alternative attributes, and alternative techniques for computing and expressing a result of the assessment process may be used without deviating from the scope of the related invention.

Criteria developed for assessing products for delivery to the target market aim to ensure that a product satisfies the wants and needs of this market segment—that is, not only the things that are considered strictly required for this market segment, but also those things that are preferred or "nice to have". In preferred embodiments, the overall focus of the criteria is on improving the product's "time to value"—that is, enabling product purchasers to quickly realize a return on their investment—as well ensuring that the product is affordable, easy to use, easy to deploy, and easy to manage.

Ten representative criteria will now be described. Per-criterion attributes are also described for each of the criteria. These representative criteria and attributes may be used advantageously, by way of example, to assess a software product for the mid-market (or other target market). FIG. 1 provides a summary of this information.

1. Priced to Market. This criterion is directed toward determining how well the assessed product is priced for its target market. Attributes for this comparison include: (i) whether the product is priced to be competitive in this market; (ii) whether the price is linked or correlated to its usage (e.g., in terms of the number of users or the number of processors on which it will be installed); and (iii) whether the total cost of the solution is competitive and attractive to the target market.

2. Easy to Install. This criterion measures how easily the assessed product is installed in its intended market. Attributes used for this measurement include: (i) whether the installation can be performed using only a single server; (ii) whether operation of the product requires only a single server; (iii) whether installation of the product is quick (i.e., measurable in minutes, not hours); (iv) whether installation of the product is non-disruptive to the system and personnel; and (v) whether the product is OEM-ready with a "silent" install/uninstall (that is, whether the product includes functionality for installing and uninstalling itself without manual intervention).

3. Complete Software Solution. This criterion judges whether the assessed product provides a complete software solution for its users. Attributes include: (i) whether all components, tools, and information needed for successfully implementing the assessed product are provided as a single package; (ii) whether the packaged solution is condensed—that is, providing only the required function; and (iii) whether all components of the packaged solution have consistent terms and conditions (sometimes referred to as "T's and C's").

4. Easy to Integrate. This criterion is used to measure how easy it is to integrate the assessed product into its target environment. Attributes used in this comparison include: (i) whether the product coexists with, and works well with, other products sold for this market by the assessed product's developer; (ii) whether the assessed product interoperates well with existing applications in its target environment; and (iii) whether the product exploits services of its target platform that have been proven to reduce total cost of ownership.

5. Easy to Manage. This criterion measures how easy the assessed product is to manage or administer. Attributes defined for this criterion include: (i) whether the product is operational "out of the box" (i.e., as delivered to the customer); (ii) whether the product, as delivered, provides a default configuration that is appropriate for most installations; (iii) whether the set-up and configuration of the product can be performed with minimal administrative skill and interaction; (iv) whether application templates and/or wizards are provided in the product to simplify use of its more complex tasks; (v) whether the product is easy to fix; and (vi) whether the product is easy to upgrade.

6. Easy to Learn and Use. Another criterion to be measured is how easy it is to learn and use the assessed product. Attributes for this measurement include: (i) whether the product's user interface is simple and intuitive; (ii) whether samples and tools are provided, in order to facilitate a quick and successful first-use experience; and (iii) whether quality documentation, that is readily available, is provided.

7. Right Function. The assessment process also measures whether the assessed product includes the "right" function. Attributes for making this decision include: (i) whether the product provides competitive features that are attractive to businesses in the target market segment; and (ii) whether the provided features function in a consistent manner within the product, product family, and platform.

8. Extensible and Flexible. Another criterion used in the assessment is the product's extensibility and flexibility. Attributes used for this measurement include: (i) whether a clear upgrade path exists to more advanced features and functions; and (ii) whether the customer's investment is protected when upgrading to advanced products.

9. Reasonable Footprint. For the mid-market (as well as for many target markets), the availability of computing resources is considered to be important, and thus a criterion used in assessing products for this market is whether the product has a reasonable footprint. Attributes include: (i) whether the product's usage of resources such as random-access memory ("RAM"), central processing unit ("CPU") capacity, and persistent storage (such as disk space) fits well on a computing platform used in the target environment; and (ii) whether the product's dependency chain is streamlined and does not impose a significant burden.

10. Target Market Platform Support. Finally, another criterion used when assessing products for the target market is the platform support. An attribute used for this purpose is whether the product is available on all "key" platforms of the target market. Priority may be given to selected platforms.

The particular criteria described for use with the related invention, and attributes used for those criteria, have been determined by market research that analyzed what factors were significant to those people making IT purchasing decisions. The assessment process disclosed in the related invention uses these criteria and attributes as a framework, evaluating them at key checkpoints throughout a product's development. The market research also included an analysis of how important the various factors were in the purchasing decision. Therefore, preferred embodiments of the related invention allow weights to be assigned to attributes and/or criteria, enabling them to have a variable influence on a product's assessment score. These weights preferably reflect the importance of the corresponding attribute/criteria to the target market segment. In FIG. 2, rankings are provided with reference to the criteria discussed, showing the relative importance of these factors for IT purchasers in the mid-market segment. (Note that there is not an exact alignment between the criteria shown in the rankings of FIG. 2 and the set of 10 criteria shown in FIG. 1. For example, the "right function" criterion of FIG. 2 is depicted as two separate entries, whereas FIG. 1 shows this as one entry having two measurement attributes. In addition, the "target market platform support" criterion is not present in FIG. 2. FIG. 2 may be considered as an initial version of the criteria in FIG. 1.)

It should be noted that the attributes and criteria that are important to IT purchasing decisions may change over time. In addition, the relative importance thereof may change. Therefore, embodiments of the related invention preferably provide flexibility in the assessment process and, in particular, in the attributes and criteria that are measured, in how the measurements are weighted, and/or in how a product's assessment score is calculated using this information.

By using the framework of the related invention with its well-defined and objective measurement criteria and attributes, and its objective checkpoints, the assessment process can be used advantageously to guide and focus product development efforts of a product under development, as well as to gauge how well a product that is ready to be marketed will be received by its target market segment. (This will be described in more detail below. See, for example, the discussion of FIG. 9.)

Products that score well using the criteria and attributes described above are products that are affordable, easy to use, easy to deploy, and easy to manage. More specifically, products that score well will provide: competitive pricing that offers an attractive entry price and a reasonable, usage-based increase in price; a total solution as a single package that is fully operational out-of-the-box; a single-server implementation that is available on all key platforms for this market segment; a successful install, configuration, and first-use experience that is fast and requires minimal skills to complete; high-quality documentation, tools, and user interface that are designed to enable rapid learning and quick exploitation of provided features; clear positioning and integration with similar products; and a clear upgrade path to more advanced capabilities while retaining existing investments.

Preferably, a scale of 1 to 5 is used for measuring each of the attributes during the assessment process. In this manner, relative degrees of support (or non-support) can be indicated. In the examples used herein, a value of 5 indicates the best case, and 1 represents the worst case. In preferred embodiments, textual descriptions are provided for each numeric value of each attribute. These textual descriptions are designed to assist product assessors in performing an objective, rather than subjective, assessment. Preferably, the textual descriptions are defined so that a product being assessed will receive a score of 3 on an attribute if the product meets the market's expectation for that attribute, a score of 4 if the product exceeds expectations, and a score of 5 if the product greatly exceeds expectations or sets new precedent for how the attribute is reflected in the product. On the other hand, the descriptions preferably indicate that a product that meets some aspect of an attribute (but fails to completely meet expectations) will receive a score of 2 for that attribute, and a product that obviously fails to meet expectations for the attribute (or is considered obsolete with reference to the attribute) will receive a score of 1.

FIG. 3 provides an example of the textual descriptions that may be used to assign a value to the "priced to be competitive" attribute of the "Priced to Market" criterion that was stated above, and is representative of an entry from an evaluation form or workbook that may be used during the product assessment. As illustrated therein, a definition 300 is preferably provided to explain the intent of this attribute to the product assessment team. (The information illustrated in FIG. 3 may be used during a product assessment carried out by a product assessment team, and/or by a product development team that wishes to determine how well its product will be assessed.)

Product assessments carried out according to techniques disclosed in the related invention preferably include comparing the product being assessed to at least one competing product. Therefore, this example indicates that identifying information is specified for the assessed product, as well as for two competitive products. See elements 310, 311, 312. For each of these products, a product name and vendor (see elements 320, 330) may be specified, along with version and release information (see element 340) or other information that identifies the particular product. (Rather than comparing the assessed product to competitors' products, it may be informative to compare the product to its predecessor or earlier version/release, in which case this predecessor can be treated as a competitive product during the assessment process.) The price and pricing model for each product (see elements 350, 360) are preferably specified as well. The pricing model may include information such as whether the product's price is computed per user, per processor, as a fixed fee, etc.

Turning now to the textual descriptions (see element 370), in the example, a value of 3 is assigned to this attribute if the price of the assessed product is considered as meeting the price of its competitor or competitors (referred to hereinafter simply as its competitor or competition). A value of 5 is assigned if the assessed product's price significantly beats the competitor's price, whereas a value of 1 is assigned if the competitor's price significantly beats the assessed product's price. If the assessed product's price beats the competitor's product, but not by a significant amount, then a value of 4 is assigned. Similarly, if the competitor's price beats the assessed product's price, but not significantly, then a value of 2 is assigned.

Finally, element 380 indicates that an optional feature of preferred embodiments allows per-attribute deviations when assigning values to attributes for the assessed product. In this example, the deviation information explains that the value of the "priced to be competitive" attribute may be adjusted if the assessed product is unique or if it is clearly superior to competitive products in selected measurements.

Similarly, descriptive text is preferably created for each of the remaining attributes for use by product assessors.

Referring now to FIG. 4, a flowchart is provided illustrating, at a high level, actions that are preferably carried out when establishing an assessment process according to the related invention. At Block 400, the assessment criteria are determined. The criteria may be determined in a number of ways, depending on factors such as the target marketplace, the type of products to be assessed, and so forth. As discussed earlier, existing market intelligence may be leveraged for this purpose. According to preferred embodiments, a number of attributes are specified within larger groupings or categories of criteria. By way of example, 10 criteria are defined in the related invention for use in the assessment process, and one or more attributes are then defined for measuring each of these criteria. (It may happen that the criteria and/or attributes are subsequently altered or refined, as discussed below with reference to Block 435, and thus the information established in Block 400 may be considered as an initial version.)

The relative priority of each of the criteria is preferably determined (Block 405). Weights may be assigned to reflect these priorities in an algorithm (see Block 430). By using per-criterion priorities and weighting, the product assessment score determined during the assessment process can be tuned to more precisely reflect the wants and needs of the target marketplace. Alternatively, rather than using a per-criterion weighting, weights may be assigned for each individual attribute.

In Block 410, objective measurements for each criterion (or, alternatively, for each attribute) are determined. As stated earlier, preferred embodiments strive to eliminate subjectivity, and these objective measurements are key to accomplishing that goal. Refer to the example shown in FIG. 3, where the textual descriptions shown at element 370 illustrate objective measurements that have been defined to assist product assessors when assigning values for a particular attribute.

Block 415 indicates that, optionally, potential deviations may be defined for each of the measurement criterion (or, alternatively, for each attribute). Preferably, whether deviations are allowable depends on the nature of each criterion and factors such as the importance of that criterion to the target marketplace. In the example of FIG. 3, as discussed above, guidelines for allowing a deviation in how the attribute value is assigned to a product's pricing information have been shown at element 380.

Then, a questionnaire is preferably developed (Block 420) for use when gathering assessment data. Preferred embodiments of the related invention use an initial written or electronic questionnaire to solicit information from the product team. See FIG. 7 for an example of a questionnaire that may be used for this purpose. An inspection process is preferably defined (Block 425), to be used as part of the assessment. This inspection is preferably a third-party evaluation, performed by a product assessment team that is separate and distinct from the product development team, during which further details and measurement data will be gathered.

An algorithm or computational steps are preferably developed (Block 430) to use the measurement data for computing a product assessment score. This algorithm may be embodied in a spread sheet or other automated technique.

One or more trial assessments may then be conducted (Block 435) for validation. For example, one or more existing products and/or competitive products may be assessed, and the results thereof may be analyzed to determine whether an appropriate set of criteria, attributes, priorities, and deviations has been put in place. If necessary, adjustments may be made, and the process of FIG. 4 may be repeated.

Figure 5:
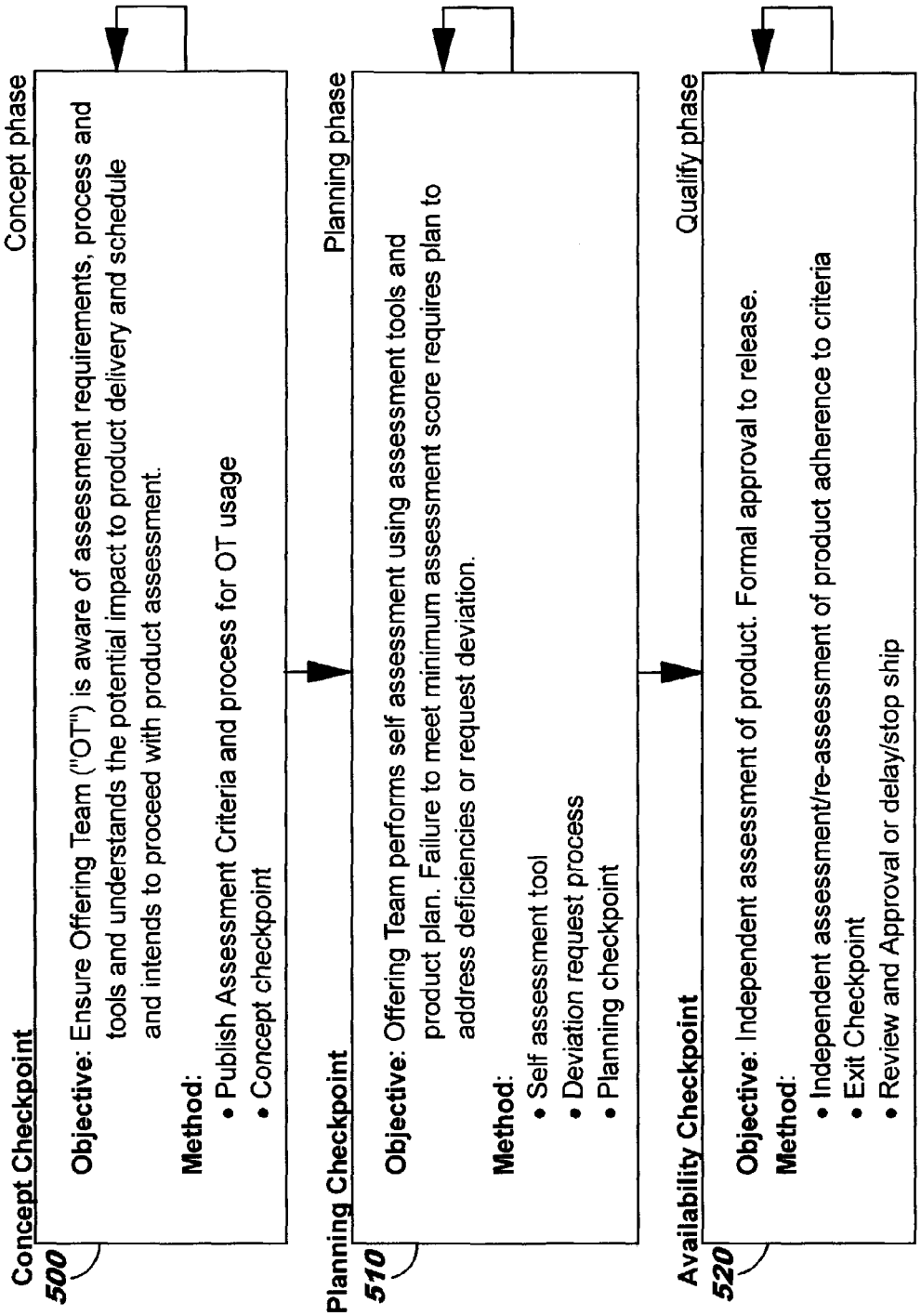
FIG. 5 describes performing a product assessment in an iterative manner, according to the related invention.

A product assessment as disclosed in the related invention is preferably performed in an iterative manner. This is illustrated in FIG. 5. According to preferred embodiments, assessments or assessment-related activities are carried out at various checkpoints (referred to equivalently herein as "plan checkpoints") during a product's development. First, as shown at element 500, assessment activities may be carried out while a product is still in the concept phase (i.e., at a concept checkpoint). In preferred embodiments, this comprises ensuring that the product's offering team ("OT") is aware of the criteria and attributes that will be used to assess the product, as well as informing them about the manner in which the assessment will be performed and its impact on their delivery and scheduling requirements.

When the product reaches the planning checkpoint, plan information is preferably used to conduct an initial assessment. This initial assessment is preferably conducted by the offering team, as a self-assessment, using the same criteria and attributes (and the same textual descriptions of how values will be assigned) as will be used by the product assessment team later on. See element 510. The offering team preferably uses its product plans (e.g., the planned product features) as a basis for this self-assessment. Typically, performing an assessment while an IT product is still in the planning phase will prove quite valuable for guiding a product plan. Plan items can be selected from among the candidates, and the subsequent development effort can then focus its efforts, in view of how this product (plan) assessment indicates that the wants and needs of the target marketplace will be met.

As stated earlier, a product assessment score is preferably expressed as a numeric value. A minimum value for an acceptable score is preferably defined, and if the self-assessment at the planning checkpoint is lower than this minimum value, then in preferred embodiments, the offering team is required to revise its product plan to raise the product's score and/or to request a deviation for one or more low-scoring attributes. Optionally, approval of the revised plan or a deviation request may be required.

Another assessment is then preferably performed during the development phase, as the product nears the end of the development phase (e.g., prior to releasing the product to market). This is illustrated in FIG. 5 by the availability checkpoint (see element 520), and a suitable score during this assessment may be required as an exit checkpoint before the product qualifies for external release. Preferably, this assessment is carried out by an independent team of product assessors, as discussed earlier. At this phase, the assessment is performed using the developed product and its associated information (e.g., documentation, related tools, and so forth that will be delivered to customers in the product package). According to preferred embodiments, if deficiencies are found in the assessed product, then recommendations are provided and the product is revised. Therefore, it may be necessary to repeat the independent assessment more than once.

FIG. 6 provides a flowchart depicting, in more detail, how a product assessment may be carried out. The product team (e.g., planning team or development team, as appropriate) answers the questions on the assessment questionnaire that has been created by the product assessors (Block 600), and then submits this questionnaire (Block 605) to the assessors or evaluators. (FIG. 7 provides a sample questionnaire.) Optionally, the evaluators may acknowledge (Block 610) receipt of the questionnaire, and primary contact information may be exchanged (Block 615) between the product team and the evaluators.

The evaluators may optionally perform a review of basic product information (Block 620) to determine whether this product is a candidate for undergoing the assessment process. Depending on the outcome (Block 625), then the flow shown in FIG. 6 may exit (if the product is determined not to be a candidate) or it may continue at Block 630.

When Block 630 is reached, then this product is a candidate, and the evaluators preferably generate what is referred to herein as an "assessment workbook" for the product. The assessment workbook provides a centralized place for recording information about the product, and when assessments are performed during multiple product phases (as discussed above), preferably includes the assessment information from each of the multiple assessments for the product. Items that may be recorded in the assessment workbook include planning information, competitive positioning, comparative data for predecessor products, inspection findings, and assessment calculations.

At Block 630, the assessment workbook is preferably populated (i.e., updated) with initial information taken from the questionnaire that was submitted by the product team at Block 600. Note that some of the information on the questionnaire may directly generate measurement data, while for other information, further details are required from the actual product assessment. For example, the product pricing information discussed above with reference to FIG. 3 can be used to assign a value from 1 to 5, using information from the questionnaire. For measurements related to installation or execution, such as how long it takes to install the product, the questionnaire answers are not sufficient, and thus values for these measurements will be supplied later (e.g., during the inspection).

A product assessment is preferably scheduled (Block 635), and is subsequently carried out (Block 640). Performing the assessment preferably comprises conducting an inspection of the product, when carried out during the development phase, or of the product plan, when carried out in the planning phase. When the operational product (or an interim version thereof) is available, this inspection preferably includes simulating a "first-use" experience, whereby an independent team or party (i.e., someone other than a development team member) receives the product in a package similar to its intended delivery package (that is, some number of CD-ROMs or other storage media, or download instructions, etc.) and then installs the product and begins to use it. (Note that when an assessment is performed using an interim version of a product, the scores that are assigned for the various attributes preferably consider any differences that will exist between the interim version and the final version, to the extent that such differences are known. Preferably, the product team provides detailed information on such differences to the product assessment team. If no operational code is available, then the inspection may be performed by review of code or similar documentation.)

Results of the inspection are captured (Block 645) in the assessment workbook. Values are assigned for each of the measurement attributes (Block 650), and these values are recorded in the assessment workbook. As discussed earlier, these values are preferably selected from a numeric range, such as 1 to 5, and textual descriptions are preferably defined in advance to assist the assessors in consistently applying the measurements to achieve an objective product assessment score.

Optionally, a similar inspection or analysis process may be carried out for the identified competition and/or predecessor products. (Or, it may happen that this information is already available from earlier assessments.) If so, then this information is also recorded in the assessment workbook.

Once the inspection has been completed and values are assigned and recorded for all of the measurement attributes, a product assessment score is generated (Block 655). One or more recommendations may also be generated, depending on how the product scores on the attributes, to inform the product team where changes should be made to improve the product's score (and therefore, its expected acceptance by the target marketplace).

According to preferred embodiments, any measurement attributes for which the assigned value is 1 or 2 require follow-up action by the product team, as these are not considered acceptable values. Thus, attributes receiving these values are preferably flagged or otherwise indicated in the assessment workbook. Preferred embodiments also require an overall score of at least 70 percent, at a minimum, and any product scoring lower than 70 percent requires review of its assessment attributes and improvement before being approved for delivery to customers. Optionally, selected attributes may be designated as critical or imperative for acceptance in the target marketplace. In this case, even though a product's overall assessment score exceeds the minimum acceptable value, if it scores a 1 or 2 on a critical attribute, then review and improvement is required on these scores before the product can be approved.

When weights have been assigned to the various measurement attributes, then these weights may be used to prioritize the recommendations that result from the assessment. In this manner, actions that will result in the biggest improvement in the product assessment score can be addressed first. (It may happen, in some cases, that a relatively minor adjustment or addition to a product makes a large difference in how well the product satisfies the wants and needs of its target market. Prioritizing the recommendations will highlight such adjustments/additions. The prioritization may also help the product team to better understand the target market, and/or stimulate discussion on how a particular attribute can be better satisfied in a timely and efficient manner.)

The assessment workbook and analysis is then sent to the product team (Block 660) for their review. The product team then prepares an action plan (Block 665), as necessary, to address each of the recommendations. A meeting between the product assessors and representatives of the product team may be held to discuss the findings in the assessment workbook and/or the recommendations. The action plan may be prepared thereafter. Preferably, the actions from this action plan are recorded in the assessment workbook.

At Block 670, a test is made as to whether this product (or product plan) should proceed. If not (for example, if the product assessment score is too low, and sufficient improvements do not appear likely or cost-effective), then the process of FIG. 6 is exited. Otherwise, as shown at Block 675, the action plan is carried out. For example, if the product is still in the planning phase, then Block 675 may comprise selecting different line items to be included in the product and/or redefining the existing line items. If the product is in the development phase, then Block 675 may comprise redesigning function, revising documentation, and so forth, depending on where low attribute scores were assigned.

Block 680 indicates that, when the product's action plan has been carried out, an application for product approval may be submitted. This application is then reviewed (Block 685) by the appropriate person(s), who is/are preferably distinct from the assessment team, and if approved (i.e., the test at Block 690 has a positive result), then the process of FIG. 6 is complete. Otherwise, if Block 690 has a negative result, then the product's application is not approved (for example, because the product's assessment score is still too low, or the low-scoring attributes are not sufficiently improved, or because this is an interim assessment), and the process of FIG. 6 iterates, as shown at Block 695.

Optionally, a special designation may be granted to the product when the test in Block 690 has a positive result. This designation may be used, for example, in the product's marketing materials, indicating that this product has passed the assessment criteria. Thus, a product that fails to meet the minimum product assessment score may still be delivered to the marketplace, but without the special designation. When using this type of special designation, a subset of an IT developer's products may receive such designations, and these products may be used for purposes of comparison or when assessing newly-developed products. For example, one of these previously-assessed products may be used in the role of a competing product, as shown at elements 311 or 312 of FIG. 3, and/or for purposes of determining the newly-developed product's ease of integration with existing products. Furthermore, the test performed at Block 625 of FIG. 6 may be made with reference to whether the product's basic product information indicates that this product is a candidate for receiving the special designation, and the decisions made at Block 670 and 690 may be made with reference to whether this product remains a candidate for, and should receive, respectively, the special designation.

As stated earlier, a minimum score is preferably specified for the product assessment process. In addition to using this minimum score for determining when an assessed product is required either (i) to make changes and undergo a subsequent assessment and/or (ii) to justify its deviations, the minimum score may be used as a gating factor for receiving the special designation discussed above. Referring now to FIG. 8, an example is provided that uses two different scores for assigning special designations to assessed products. As shown therein (see element 800), a product may be designated as "star" if its overall product assessment score exceeds 80 percent (or some other appropriate score) and each of the assessed attributes has been assigned a value of 3 or higher on the 5-point scale. Or, the product may be designated as "ready" (see element 810) if the following criteria are met: (1) its overall product assessment score exceeds 70 percent; (2) a committed plan has been developed that addresses all attributes scoring lower than 3 on the 5-point scale; and (3) a committed plan is in place to satisfy, before availability of the product to its customers, all attributes that have been determined to be "critical" for success in the target marketplace. (Alternative criteria for assigning a special designation to a product may be defined, according to the needs of a particular environment in which the techniques disclosed in the related invention are used.)

Element 820 provides a sample list of criteria and attributes that have been identified as critical. In this example, 9 of the 10 measurement criteria are represented. (That is, a critical attribute has not been identified for the "target market platform support" category.) For these 9 criteria, 16 different attributes are identified are critical. By comparing the list at 820 to the attributes identified in FIG. 1, it can be seen that there are a number of attributes that are considered important for measuring, but that are not considered to be critical. (For example, in the "priced to market" criterion, "competitive pricing" and "price linked to usage" are considered critical attributes, but the "total cost of solution is competitive and attractive" is not considered critical.) Preferably, the identification of critical attributes depends on the wants and needs of the target marketplace, and is substantiated with market intelligence or consumer feedback. This list may be revised over time, as necessary, to keep pace with changes in those wants and needs. When weights are assigned to attributes for computing a product's assessment score, as described above, a relatively higher weight is preferably assigned to the attributes appearing on the critical attributes list.

FIG. 9 shows a sample report 900 providing an example of assessment results for an assessed product named "Product XYZ". Preferably, a report is prepared after each assessment, and provides information that has been captured in the assessment workbook. As shown at element 910, the product's overall assessment score is listed. In this example, the assessed product has received an overall score of 87.65 percent. It has been compared to two other products, "Product ABC" (which may be a predecessor from the same company) and "Acme Computing Product" (which may be a competitor's product). Using the same measurement criteria and attributes, these products received scores of 67.89 percent and 71.23 percent, respectively. Thus, the product team is provided with an at-a-glance view of how their product compares to other products for the same marketplace. This allows the product team to determine how well their product will be received by its target marketplace, and when the score is lower than the required minimum, to gauge the amount of rework that will be necessary before the product is made available to customers.

A summary 920 is also provided, listing each of the attributes that did not achieve the minimum acceptable score (which, in preferred embodiments, is a 3 on the 5-point scale, as stated above). In this example, two attributes 921, 922 failed to meet this minimum score. In the example report, the actual score assigned to the attributes is presented, along with an impact value and comments. The impact value indicates, for each attribute, how much of an improvement to the overall assessment score would be realized if this attribute's score was raised to the minimum score of 3. For example, if the installation of Product XYZ was repackaged so that the product and all of its dependencies were installable from a single package, then the assessment score could be raised from 87.65 percent to 88.32 percent, an increase of 0.67 percent. Similarly, a 0.34 percent improvement could be realized by improving the score for the "samples and tools are provided" attribute 922. For each attribute in this summary, the assessment team preferably provides comments that explain why the particular attribute value was assigned.

A recommended actions summary 930 is also provided, according to preferred embodiments, notifying the product team as to the assessment team's recommendations for improving the product's score. In this example, two actions have been provided, one for each of the attributes that did not meet requirements.

Note that the attributes in summary 920, and the corresponding actions in summary 930, are listed in decreasing order of potential improvement in the assessment score. This prioritized ranking is beneficial to the product team, as it allows them to prioritize their efforts for revising the product in view of where the most significant gains can be made in product acceptance. (Preferably, attribute weights are used in determining the impact values shown for each attribute in summary 920, and these impact values are then used for the prioritization.)

Additional, more-detailed information may also be included in assessment reports, although this detail has not been shown in the sample report 900. Preferably, the summary information shown in FIG. 9 is followed by a complete listing of all attributes that were measured, the measurement values assigned to those attributes, and any comments provided by the assessment team. If this product has previously undergone an assessment and is being reassessed as to improvements that have been made, then the earlier measurement values are also preferably provided. Optionally, per-attribute values of the competitive products against which this product was compared may also be provided. Where critical attributes have been defined, these attributes may be visually highlighted in the report.

Presently, there is a strong focus in the IT industry on so-called "autonomic computing" initiatives. FIG. 10 provides a chart listing generally-accepted goals or characteristics of autonomic computing, which are typically broken down into four factors: (1) self-configuring; (2) self-healing; (3) self-optimizing; and (4) self-protecting. FIG. 10 also provides a detailed description of each of these factors. An IT product exhibiting these characteristics may be considered as supporting autonomic computing.

The criteria and attributes that were defined for assessing an IT product's acceptance by the mid-market, and extensions of these attributes, have been evaluated with reference to these autonomic computing characteristics. FIG. 11 provides a chart 1100 showing how attributes from the Easy to Install, Easy to Manage, Easy to Integrate, Easy to Learn and Use, and Extensible and Flexible criteria may be mapped to the autonomic computing characteristics. Optionally, a product's support for autonomic computing characteristics can be factored into the assessment of how well the product meets the wants and needs of its target marketplace by reflecting the autonomic computing characteristics in the textual descriptions that are used for assigning values to one or more of the measurement attributes. This will now be described with reference to the mapping in FIG. 11. As shown therein with reference to the Easy to Install criterion, if an IT product can be installed and operated with minimal skill and interaction, then the product can be considered as meeting requirements for the self-configuring characteristic. See element 1110. (Note that the description for "self-configuring" in row 1110 aligns somewhat more closely with the "Easy to Manage" criterion definition in FIG. 1, as opposed to the "Easy to Install" criterion. This illustrates that one implementation of the related invention may arrange the attributes differently than another implementation, if desired. For example, one or more attributes from the "Easy to Install" criterion may be moved to the "Easy to Manage" criterion.)

The Easy to Manage criterion is addressed at element 1120. If upgrades can be performed with minimal skill and interaction, then the product can again be considered self-configuring. If problems can be fixed with minimal skill and interaction, then the product may be considered as self-healing. If performance of the product can be improved with minimal skill and interaction, then the product may be considered as self-optimizing. And, if security threats to an IT infrastructure can be neutralized with minimal skill and interaction, then this product may be considered as possessing the self-protecting characteristic.

If the product is able to detect other products, and integrate with those other products, then it may be considered as meeting attributes of the Easy to Integrate criterion (see element 1130), and also as having the characteristic of self-configuring.

A product that has the self-optimizing characteristic allows users and administrators to worry less about having to do everything correctly from the start, and thus may be considered as meeting attributes of the Easy to Learn and Use criterion. See element 1140. Similarly, a product that has the self-protecting characteristic allows less worry over accidental exposure of sensitive information, and thus this is another reason for considering the product easy to learn and to use.

Finally, if extensions can be made to the product with minimal skill and interaction, then the product may be considered as having the self-configuring characteristic, and as possessing attributes of the Extensible and Flexible criterion, as shown at element 1150.

Thus, the chart 1100 in FIG. 11 demonstrates that attributes can be defined in different ways and extended, in view of how a product is to be evaluated, and that the criteria and attributes may be applied for purposes other than how a product will be accepted by its target marketplace. Therefore, an assessment may be performed using attributes such as those presented in FIG. 11 to determine an IT product's support for the characteristics of autonomic computing.

As has been demonstrated, the related invention defines advantageous techniques for assessing IT products. Importance of various attributes to the target marketplace are reflected in the assessments, and assessment results may then be provided to product teams to influence the importance of product planning and/or development efforts.

The assessment techniques disclosed in the related invention may be leveraged, according to the present invention, for IT portfolio management, as will now be described. To achieve the most value for a given investment of resources, the products in an IT portfolio (or selected products from the portfolio) can be assessed to determine how best to use those resources. Using the objective attribute-by-attribute results of the assessment, information can be obtained showing where each assessed product needs improvement, and where the product strengths lie. The products in the portfolio may be ranked by their assessment scores, and individual attribute scores and/or recommendations may be analyzed. (When assessment workbooks are stored in electronic form, embodiments of the present invention may programmatically generate reports such as an in-order ranking of assessed products, facilitating a product-by-product comparison. Reports may also or alternatively be generated to provide attribute-by-attribute comparisons.) Typically, the lowest-scoring products are those that will require the most investment of additional resources to bring them up to market expectations, and for some products, this investment may not be cost-effective.

Suppose, for example, that a company that produces IT products has a portfolio of already-existing products. The company may wish to improve the market share of its products, and/or to deploy selected products into new market segments. Existing products can be assessed, using techniques of the related invention, to obtain an objective determination of each product's shortfalls in terms of the attributes that have been developed to represent the target market.

The products in the portfolio may also be compared to competitive products that have been similarly assessed. This comparison to competitive products may be performed to determine which portfolio products are better than the competitive products, which are worse, which are better in view of selected attributes, and so forth, using appropriate comparison criteria.

When the recommendations that result from the assessment are weighted in view of the relative importance of the attributes to the target market, a subset of the company's products can be identified whose assessment scores (and therefore their predicted acceptance by the target market) can be improved most significantly with the least investment of additional resources. Those products that would require significant resources to improve acceptance in the target market can then be identified as well, and a decision may be made that some products cannot be brought up to market expectations with a cost-effective investment.

For example, it may be determined that one product scores very well except in the attributes related to installation, while other products need improvements in several of the measurement criteria. It may be most cost-effective, in this example, to invest in improvements to the product with poor installation scores, if a relatively minor or localized change to the installation procedures can raise the score for several different attributes.

An IT portfolio may comprise products that have been developed originally for one market segment, in view of product expectations in that segment. Using techniques of the related and present inventions, assessments can be performed for those products (or selected products from the portfolio) to determine whether it would be cost-effective to deploy the product in one or more different market segments. Suppose, for example, that a company's IT products are currently being marketed to large businesses (sometimes referred to as the "enterprise" market). By assessing these products in view of attributes defined for the mid-market, for example, the company may learn which products can be cross-marketed with relatively little resource investment. It may happen that the IT environments of the existing large business customers already have database management products installed, for example, whereas this is not necessarily the case for the mid-market IT environment. Thus, while a product may be currently packaged without the database management product for marketing to the enterprise market, the assessment may identify the need to repackage the product for the mid-market segment so that the database management product is included. Or, it may be determined that shortcomings in the assessed products are related to pricing. For example, the product pricing model may need to be revised in view of the lower number of potential users in the mid-market, as compared to the enterprise market. (Many other examples of market-specific differences may be imagined, and the attribute scores can be used to identify problem areas accordingly.)

Again, the objective attribute-by-attribute results of the product assessments, along with the prioritized recommendations resulting from the assessments, can be used in this type of portfolio review. In this case, the review is preferably directed toward identifying the products that will require the least investment of resources in order to be most acceptable to the new target market(s).

As another example of how the present invention may be used advantageously, a venture capitalist may wish to invest in a company's IT portfolio, or one company may wish to license or purchase products from another company's IT portfolio. The product assessment scores, attribute-by-attribute scores, and/or prioritized recommendations can be used to determine which products are most attractive financially.

As still another example, a company may have IT products in their portfolio, but may lack objective information about how well those products meet customer expectations or why selected products have failed to meet their revenue projections. Because there may be a wide variety of factors that contribute to success in the marketplace, as discussed earlier, prior art techniques are normally limited to a best-guess approach which tends to be subjective in nature.

In some scenarios, the present invention's adaptation of the product assessment techniques of the related invention implies some differences in how the assessment cycle is carried out. In particular, the products in this type of portfolio review are often already developed, and therefore the concept and planning phases do not exist as they have been described above with reference to FIG. 5. Therefore, the assessment may be carried out as if there was only one plan phase or checkpoint (e.g., as if the existing product was in the qualify phase 520 of FIG. 5.) However, as will be obvious, if products from the portfolio are selected for revision, then these revised versions may proceed through the plan checkpoints in FIG. 5.

FIG. 12 illustrates how products can be selected for investment within a portfolio of IT products, using an assessment score and development sizings for a set of products that have been assessed using techniques disclosed herein. As shown in this example report 1200, assessment scores have been determined for three products (see columns 1210, 1220, and 1230 of row "a" 1240). In addition, the potential improved assessment score for each product, after making recommended improvements (e.g., as recommended by the product assessment team), has also been determined (see row "b" 1241).

Using the approach in FIG. 12, the potential improvement to the assessment score is then computed by subtracting row "a" from row "b", as shown in row "c" 1242. An estimate of the development cost to make each set of recommended improvements is then computed, and figures for the three example products are shown in row "d" 1243.

Next, the estimated cost to improve the assessment score by 1 point is computed, for each product, by dividing the total estimated cost in row "d" by the potential improvement number in row "c". The result for the example products is shown in row "e" 1244.

This information can be used in various ways when analyzing the products in an IT portfolio. As one example, represented in row "f" 1245, the estimated cost for each 1-point improvement can be used to determine how a company can most economically improve its portfolio. That is, row "e" 1244 indicates that the greatest return on investment, when considering a single product, is available by investing in "Product 3" (see column 1230 of row "e" 1244), and therefore this product is assigned the highest investment priority of "1" (see column 1230 of row "f" 1245).

On the other hand, the products in the portfolio may be ranked according to their potential improved assessment scores. This is shown in row "g" 1246, and as noted there, the rankings are in terms of the potential (improved) assessment scores in row "b" 1241. Thus, a company might wish to focus its development efforts on "Product 1" (see column 1210 of row "g" 1246), since this appears to be the product that can become most desirable to the target market.

The rankings in rows "f" 1245 and "g" 1246 can be combined to yield an "investment attractiveness" value. This is shown in row "h" 1247, where the values in those rows "f" and "g" have been multiplied together. As noted in FIG. 12, a lower score in row "h" is better, and therefore "Product 3" is indicated as the most attractive candidate for investment. The numbers in row "h" are used to determine an in-order ranking for investment priority, which is shown in row "i" 1248.

As can be seen by reviewing the example report 1200, the techniques of the present invention (along with those of the related invention) allow IT portfolio management to be performed using objective data. Other types of computations may be performed using the assessment results and/or recommendations for a set of IT products, if desired, and thus FIG. 12 should be considered as illustrative of, but not limiting, the present invention.

As another example of how the computations may be used, an organization may wish to invest resources in selected products in order to improve those products so that they are equal to the assessment scores of one or more competing products (or, alternatively, the competitor(s)'s score on selected attributes), or it may choose to invest sufficiently that one or more products will exceed the assessment score of one or more competing products (or, again, the score received by one or more competing products on selected attributes). The information obtained as disclosed herein, and as illustrated in FIG. 12, facilitates determining the resource investment (e.g., identifying which product or products to improve, which area or areas of those products should receive the resource investment, the projected cost of the improvement, and how the improved product will then compare to its competitors).

The disclosed techniques may also be used advantageously in methods of doing business. In one aspect, these techniques may be used to improve product development efforts by companies developing or revising an IT portfolio. For example, the disclosed techniques may be leveraged to identify which products from the portfolio justify investment of additional resources, to prioritize line item candidates during the product planning phase, and/or to prioritize development work during the development phase, in view of improving the company's IT portfolio (for example, as has been discussed above with reference to FIG. 12). The disclosed techniques may also be used in a predictive manner, for example to predict how well a product will be accepted in a new target market. This information may be used for business planning purposes (e.g., to predict revenues and market share). In another aspect, the disclosed techniques may be used to implement a third-party portfolio review service. Users of this service may include venture capitalists or product investors who wish to have an independent assessment of products they may wish to invest in, and so forth. Fees may optionally be charged for the assessments and/or reviews. Various revenue models may used for a fee-based service, such as pay-per-use billing, a subscription service, monthly or other periodic billing, and so forth.

As will be appreciated by one of skill in the art, embodiments of techniques of the present invention may be provided as methods, systems, or computer program products. Accordingly, an implementation of techniques of the present invention may take the form of an entirely hardware embodiment, an entirely software embodiment, or an embodiment combining software and hardware aspects. Furthermore, an implementation of techniques of the present invention may take the form of a computer program product which is embodied on one or more computer-usable storage media (including, but not limited to, disk storage, CD-ROM, optical storage, and so forth) having computer-usable program code embodied therein.

The present invention, and in particular the related invention which it leverages, has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of managing an information technology ("IT") portfolio, comprising:
   determining a plurality of criteria that are important to a target market for products in an IT portfolio, and at least one attribute to be used for measuring each of the criteria;
   specifying objective measurements for each of the attributes;
   conducting an evaluation of a plurality of the IT products in the portfolio, wherein the evaluation of each of the IT products further comprises:
      inspecting a representation of the IT product, with reference to selected ones of the attributes;
      assigning attribute values to the selected attributes, according to how the IT product compares to the specified objective measurements;
      programmatically computing an assessment score, for the IT product, from the assigned attribute values using computer-readable program code executed by a computer;
      for each of the selected attributes for which the assigned attribute value falls below a threshold value, using computer-readable program code executed by the computer to programmatically compute an assessment score increase that will result by raising that assigned attribute value to the threshold value, the programmatically computing an assessment score increase comprising recomputing a value of the assessment score for the IT product using the threshold value as a replacement for the assigned attribute value of the selected attribute; and
      using computer-readable program code executed by the computer to programmatically compute a potential assessment score for the IT product by summing the assigned attribute values and the programmatically-computed assessment score increases; and
   using the programmatically-computed assessment score and the programmatically-computed potential assessment score for each of the plurality of evaluated IT products to select a subset of the IT products in the IT portfolio.

2. The method according to claim 1, wherein using the programmatically-computed assessment scores and the programmatically-computed potential assessment scores to select the subset further comprises selecting one or more of the evaluated IT products having the highest potential assessment scores, such that the subset comprises those evaluated IT products for which none of the assigned attribute values for the selected ones of the attributes falls below the threshold value.

3. The method according to claim 1, wherein using the programmatically-computed assessment scores and the programmatically-computed potential assessment scores to select the subset is performed programmatically using computer-readable program code executed by the computer.

4. The method according to claim 1, wherein using the programmatically-computed assessment scores and the programmatically-computed potential assessment scores to select the subset is performed using an electronic version of one or more product assessment workbooks, each workbook recording the assigned attribute values from the evaluation of one or more of the IT products.

5. The method according to claim 1, further comprising using the subset to determine which of the IT products in the portfolio will be revised.

6. The method according to claim 1, further comprising using the subset to determine which of the IT products in the portfolio will be deployed to one or more new target markets.

7. The method according to claim 1, wherein using the programmatically-computed assessment scores and the programmatically-computed potential assessment scores further comprises comparing the programmatically-computed assessment scores to assessment scores computed for one or more competitive products, and wherein the subset is selected as one or more of the evaluated IT products whose programmatically-computed assessment scores compare to the assessment scores of the competitive products according to a particular comparison criterion.

8. The method according to claim 1, further comprising using the subset to determine which of the IT products are financially desirable.

9. The method according to claim 1, further comprising:
for each of the evaluated IT products, determining a cost of achieving the programmatically-computed potential assessment score for the IT product; and
for each of the evaluated IT products, using computer-readable program code executed by the computer to programmatically compute a per-point cost of each point by which the programmatically-computed potential assessment score for that IT product is higher than the programmatically-computed assessment score for that IT product; and
wherein using the programmatically-computed assessment scores and the programmatically-computed potential assessment scores to select the subset further comprises using the programmatically-computed per-point cost for each of the IT products to select the subset.

10. The method according to claim 9, wherein using the programmatically-computed per-point cost for each of the IT products to select the subset further comprises selecting one or more of the evaluated IT products having the lowest programmatically-computed per-point cost, such that the subset comprises those evaluated IT products for which the lowest investments of resources are needed to improve the assessment scores of those IT products for the target market.

11. The method according to claim 9, further comprising using the programmatically-computed per-point cost for each of the IT products to determine which of the IT products cannot be revised in a cost-effective manner.

12. The method according to claim 9, wherein using the programmatically-computed per-point cost for each of the IT products to select the subset further comprises using computer-readable code executed by the computer to:
compute an investment priority for each of the evaluated IT products by assigning a lowest number to the IT product having the lowest programmatically-computed per-point cost and successively assigning a next-highest number to the IT product having the next-lowest programmatically-computed per-point cost;
compute a score priority for each of the evaluated IT products by assigning a lowest number to the IT product having the highest potential assessment score and successively assigning a next-highest number to the IT product having the next-highest potential assessment score;
multiply the investment priority number assigned to each of the IT products by the score priority number assigned to that IT product, yielding an investment attractiveness score for that IT product; and
select, as the subset, one or more of those evaluated IT products having lowest values for the investment attractiveness score.

13. The method according to claim 12, further comprising using the subset to determine investment priority for the IT products in the portfolio.

14. The method according to claim 1, wherein the conducting further comprises generating a list of recommended actions, the list having an entry for each of the selected attributes for which the assigned attribute value falls below the threshold value, each of the entries providing at least one suggestion for improving the assigned attribute value and a specification of the programmatically-computed assessment score increase for that selected attribute.

15. A system for managing an information technology ("IT") portfolio, comprising:
a computer comprising a processor; and
instructions which execute, using the processor, to implement functions comprising:
recording results of conducting an evaluation of a plurality of the IT products in the portfolio, wherein the evaluation of each of the IT products further comprises:
inspecting a representation of the IT product, with reference to selected ones of a plurality of attributes which are used for measuring a plurality of criteria that are important to a target market for the products in the IT portfolio, wherein specified objective measurements are used for measuring each of the attributes;
assigning attribute values to the selected attributes, according to how the IT product compares to the specified objective measurements;
programmatically computing an assessment score, for the IT product, from the assigned attribute values;
for each of the selected attributes for which the assigned attribute value falls below a threshold value, programmatically computing an assessment score increase that will result by raising that assigned attribute value to the threshold value, the programmatically computing an assessment score increase comprising recomputing a value of the assessment score for the IT product using the threshold value as a replacement for the assigned attribute value of the selected attribute; and
programmatically computing a potential assessment score for the IT product by summing the assigned attribute values and the programmatically-computed assessment score increases; and
using the programmatically-computed assessment score and the programmatically-computed potential assessment score for each of the plurality of evaluated IT products to select a subset of the IT products in the IT portfolio.

16. A computer program product for managing an information technology ("IT") portfolio, the computer program product embodied on one or more computer-readable media and comprising computer-readable instructions that, when executed on a computer, cause the computer to:

record results of conducting an evaluation of a plurality of IT products in an IT portfolio, wherein the evaluation of each of the IT products further comprises:

inspecting a representation of the IT product, with reference to selected ones of a plurality of attributes which are used for measuring a plurality of criteria that are important to a target market for the products in the IT portfolio, wherein specified objective measurements are used for measuring each of the attributes;

assigning attribute scores for the selected attributes, according to how the IT product compares to the specified objective measurements;

programmatically computing an assessment score, for the IT product, from the assigned attribute values;

for each of the selected attributes for which the assigned attribute value falls below a threshold value, programmatically computing an assessment score increase that will result by raising that assigned attribute value to the threshold value, the programmatically computing an assessment score increase comprising recomputing a value of the assessment score for the IT product using the threshold value as a replacement for the assigned attribute value of the selected attribute; and programmatically computing a potential assessment score for the IT product by summing the assigned attribute values and the programmatically-computed assessment score increases; and use the programmatically-computed assessment score and the programmatically-computed potential assessment score for each of the plurality of evaluated IT products to select a subset of the IT products in the IT portfolio.

\* \* \* \* \*